US010941877B2

(12) United States Patent
Wada et al.

(10) Patent No.: US 10,941,877 B2
(45) Date of Patent: Mar. 9, 2021

(54) SWITCHING VALVE

(71) Applicant: SHIMADZU CORPORATION, Kyoto (JP)

(72) Inventors: Kosuke Wada, Kyoto (JP); Kenta Matsumoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/631,720

(22) PCT Filed: Sep. 1, 2017

(86) PCT No.: PCT/JP2017/031586
§ 371 (c)(1),
(2) Date: Jan. 16, 2020

(87) PCT Pub. No.: WO2019/043908
PCT Pub. Date: Mar. 7, 2019

(65) Prior Publication Data
US 2020/0182362 A1 Jun. 11, 2020

(51) Int. Cl.
F16K 37/00 (2006.01)
F16K 11/074 (2006.01)
(Continued)

(52) U.S. Cl.
CPC ...... *F16K 37/0041* (2013.01); *F16K 11/0743* (2013.01); *F16K 31/041* (2013.01);
(Continued)

(58) Field of Classification Search
CPC ............ F16K 37/0041; F16K 11/0743; F16K 31/042; F16K 31/041; G01N 30/20; Y10T 137/8225
See application file for complete search history.

(56) References Cited

U.S. PATENT DOCUMENTS 3,297,053 A * 1/1967 McKinney .......... F16K 11/0743
137/625.46
4,156,437 A * 5/1979 Chivens .............. F16K 11/0743
137/554
(Continued)

FOREIGN PATENT DOCUMENTS

JP H10-197504 A 7/1998
JP 2014-178002 A 9/2014

OTHER PUBLICATIONS

International Search Report for corresponding Application No. PCT/JP2017/031586, dated Nov. 21, 2017.
(Continued)

*Primary Examiner* — Umashankar Venkatesan
(74) *Attorney, Agent, or Firm* — Renner, Otto, Boisselle & Sklar, LLP

(57) ABSTRACT

A switching valve includes a valve head having a plurality of connection ports connecting a pipe, a rotor accommodated therein and including a groove for connecting the connection ports, and a rotor shaft holding the rotor and rotatably equipped, and a driver having a holder holding the valve head and a motor rotating the rotor shaft of the valve head held by the holder. Further, the valve head is provided with a home position sensor detecting a reference position in a rotation direction of the rotor shaft, and a teaching information holder holding information on a relative positional relationship between the reference position and a position of the rotor shaft when the rotor is at a predetermined position, and the reference position acquired using the home position sensor.

2 Claims, 4 Drawing Sheets

(51) Int. Cl.
*F16K 31/04* (2006.01)
*G01N 30/20* (2006.01)
(52) U.S. Cl.
CPC .......... *F16K 31/042* (2013.01); *G01N 30/20* (2013.01); *Y10T 137/8225* (2015.04)

(56) References Cited

U.S. PATENT DOCUMENTS

| | | | | |
|---|---|---|---|---|
| 4,444,066 A | * | 4/1984 | Ogle | G01N 30/20 73/61.56 |
| 8,763,637 B2 | * | 7/2014 | Soldo | F16K 37/0041 137/554 |
| 2003/0006729 A1 | * | 1/2003 | Raymond | F16K 31/042 318/687 |
| 2006/0231784 A1 | * | 10/2006 | Quitmeyer | F16K 31/047 251/129.11 |
| 2014/0261811 A1 | * | 9/2014 | Tanaka | F16K 11/0743 137/625.11 |
| 2014/0261814 A1 | * | 9/2014 | Tanaka | F16K 11/0743 137/625.46 |
| 2014/0261815 A1 | * | 9/2014 | Tanaka | F16K 11/0743 137/625.65 |
| 2014/0261816 A1 | | 9/2014 | Tanaka | |
| 2015/0198255 A1 | * | 7/2015 | Gamache | F16K 5/161 137/1 |

OTHER PUBLICATIONS

Written Opinion for corresponding Application No. PCT/JP2017/031586, dated Nov. 21, 2017.
C1 Valve System Automation Tools and Solutions, Agilent 1290 Infinity Valve Solution (Catalog), Agilent Technologies Inc., Aug. 1, 2012 (with partial English translation).
Taiwan Office Action for corresponding Application No. 107126270, dated May 29, 2019.

* cited by examiner

SWITCHING VALVE

TECHNICAL FIELD

The present invention relates to a rotary-type switching valve for switching a connection state between ports by rotating a rotor provided with a groove for connecting the ports.

BACKGROUND ART

An analyzer such as a liquid chromatograph is generally configured to switch a channel configuration using a rotary-type switching valve. For example, in a liquid chromatograph, an autosampler that automatically injects a sample into an analysis channel is used. The autosampler is configured to be switched to a channel configuration when a sample is collected from a sample container and to a channel configuration when the collected sample is injected into the analysis channel by a rotary-type switching valve.

A rotary-type switching valve is configured with a valve head having a rotor inside and a driver having a stepping motor and the like for rotating the rotor in the valve head. A plurality of ports for connecting pipes are provided on an outer surface on the tip side of the valve head, and a groove for connecting the ports is provided on the rotor disposed in the valve head. A connection state between the ports is configured to be switched by rotation of the rotor by a motor (see Patent Document 1).

Positioning to a desired position in a rotation direction of the rotor is performed by controlling a driving amount of the stepping motor from an initial position of the rotor, that is, the number of drive pulses applied to the stepping motor. In order to detect the initial position of the rotor, a disk having a slit is attached to a shaft for transmitting the rotation of the stepping motor to the rotor, and an optical sensor (hereinafter referred to as a home position sensor) for detecting the slit of the disk is provided.

The positioning accuracy in the rotation direction of the rotor is determined by an attaching angle of the rotor with respect to a rotor shaft (slit position of the disk). However, such positional accuracy includes an error due to variations in processing and assembly, and it is difficult to completely eliminate such errors in design.

Therefore, after the switching valve is assembled, teaching, in other words, programing, a control device to remember the attaching angle of the rotor with respect to the rotor shaft is generally performed (see Patent Document 2).

PRIOR ART DOCUMENTS

Patent Documents

Patent Document 1: Japanese Patent Laid-open Publication No. 2014-178002

Patent Document 1: Japanese Patent Laid-open Publication No. 10-197504

SUMMARY OF THE INVENTION

Problems to be Solved by the Invention

In the analysis using a liquid chromatograph, the demand for high-speed analysis has been increasing in recent years, and high pressure resistance is required for devices, such as an autosampler, and, accordingly, a switching valve incorporated in those devices is also required to have high pressure resistance. On the other hand, if the switching valve has high pressure resistance, a frictional force at the time of sliding between a rotor and a stator in a valve head increases accordingly, so the speed of deterioration due to wear of the rotor and stator is increased, and durability is lowered. For this reason, a switching valve having pressure resistance according to the application by the user is desirable.

In general, the difference between a switching valve of high pressure resistance and a switching valve of low pressure resistance lies in the valve head portion, and the configurations of the drivers having a motor or the like are the same. Therefore, the pressure resistance of the switching valve incorporated in the autosampler or the like can be changed by replacing only the valve head portion of the switching valve.

However, in a conventional switching valve, it is not possible to replace only the valve head. In a case where only a valve head can be replaced, since a relative positional relationship between a rotor and a rotor shaft varies from valve head to valve head, teaching information obtained before replacement of the valve head cannot be used after the replacement of the valve head. For this reason, teaching needs to be performed again after a valve head portion is replaced, which causes a heavy work burden on the user.

In view of the above, an object of the present invention is to prevent the need for performing teaching even if a valve head of a rotary-type switching valve is replaced.

Solutions to the Problems

A switching valve according to the present invention includes a valve head having a plurality of connection ports connecting a pipe, a rotor accommodated therein and including a groove for connecting the connection ports, and a rotor shaft holding the rotor and rotatably equipped, and a driver having a holder holding the valve head and a motor rotating the rotor shaft of the valve head held by the holder. Furthermore, the valve head is provided with a home position sensor for detecting a reference position in a rotation direction of the rotor shaft, and a teaching information holder for holding information. The teaching information is information regarding a relative positional relationship between the reference position and a position of the rotor shaft when the rotor is at a predetermined position.

As described above, the positioning accuracy in the rotation direction of the rotor is determined by the accuracy of a relative attaching position of the rotor with respect to the rotor shaft. Conventionally, in a case where the rotor is replaced, the attaching position of the rotor with respect to the rotor shaft changes. For this reason, it has been necessary to perform teaching again to acquire information on a relative positional relationship between the rotor shaft and the rotor.

In contrast, in the present invention, a valve head is provided with a home position sensor for detecting a reference position in the rotation direction of the rotor shaft. For this reason, the information on a relative positional relationship between the rotor shaft and the rotor, that is, teaching information acquired using the home position sensor is information specific to the valve head. In the present invention, the valve head is provided with a teaching information holder for holding teaching information specific to each valve head.

The switching valve according to the present invention preferably includes a controller that is configured to read the teaching information from the teaching information holder of the valve head held by the holder of the driver, and to control the operation of the motor based on the teaching information. In this manner, when the valve head is replaced, teaching information specific to the valve head is read from the teaching information holder of a new valve head and used for positioning of the rotor, so that the user does not need to perform teaching work.

Effects of the Invention

In the switching valve according to the present invention, a valve head includes a home position sensor for detecting a reference position in a rotation direction of a rotor shaft, and a teaching information holder that holds teaching information specific to the valve head related to a relative positional relationship between the rotor shaft and a rotor acquired using the home position sensor. Accordingly, the valve head itself holds the teaching information specific to the valve head. For this reason, when a valve head is replaced with a new one, and teaching information is read from the teaching information holder provided in the new valve head, new teaching work does not need to be performed. This eliminates the need for teaching work after a valve head is replaced.

EMBODIMENT OF THE INVENTION

Hereinafter, an embodiment of a switching valve according to the present invention will be described below with reference to FIGS. 1 to 4.

Figure 1:
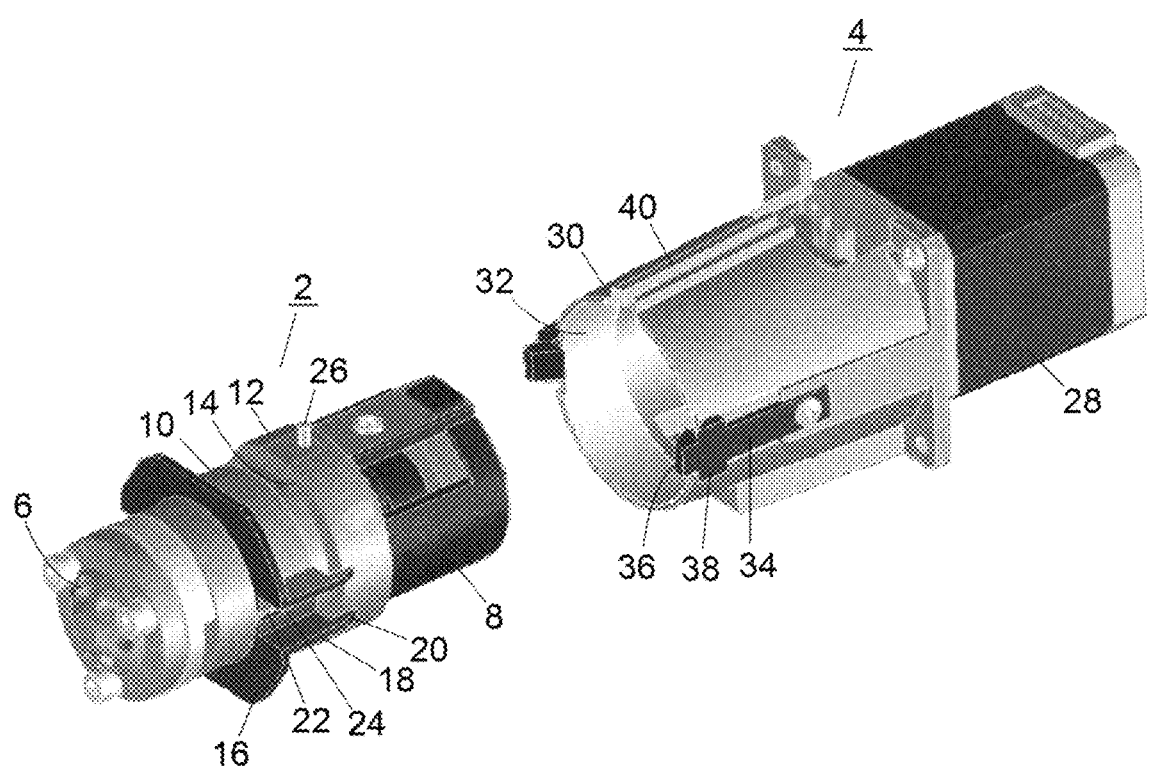
FIG. 1 is a perspective view showing a state in which a valve head and a driver of an embodiment of a switching valve are separated.
Figure 2:
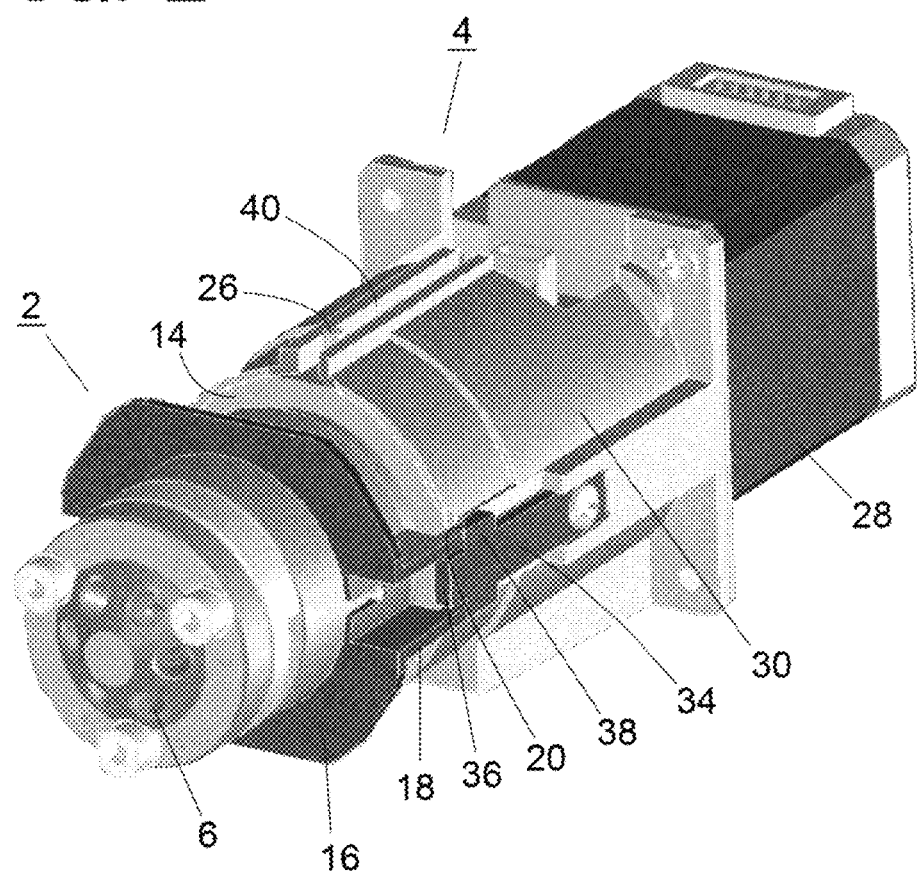
FIG. 2 is a perspective view showing a state in which the valve head of the switching valve of the embodiment is mounted on the driver.

As shown in FIGS. 1 and 2, the switching valve includes a valve head 2 and a driver 4, and the valve head 2 and the driver 4 are attachable to and detachable from each other. FIG. 1 shows a state in which the valve head 2 is removed from the driver 4, and FIG. 2 shows a state in which the valve head 2 is attached to the driver 4.

The valve head 2 is a cylindrical member having a plurality of ports 6 for connecting pipes to a tip portion. The valve head 2 is provided with a stator 42, a rotor 44, and a rotor shaft 46 for rotating the rotor 44 (see FIG. 3). When the valve head 2 is attached to the driver 4, a base end of the rotor shaft 46 is connected to a drive shaft 28a of a motor 28 of the driver 4, so that the rotor 44 is rotated by the motor 28. An internal structure of the valve head 2 and the driver 4 will be described later.

The driver 4 is provided with the motor 28 for rotating the rotor shaft 46 (see FIG. 3) of the valve head 2 on the base end side, and is provided with a holder 30 for holding the valve head 2 fitted from the base end side on the tip side. The holder 30 is a cylindrical member having an opening 32 at the tip. The valve head 2 is mounted on the driver 4 as a large-diameter portion 12 provided closer to the tip side than a base end portion 8 is fitted into the holder 30 from the opening 32.

In the holder 30 of the driver 4, fixing pins 34 (fixing tools) that fix the valve head 2 to the holder 30 by being caught by a stepped portion 14 on an outer surface of the valve head 2 when the valve head 2 is inserted to a predetermined position in the holder 30 are provided at two positions facing each other. The fixing pin 34 has a base end fixed to an outer surface of the holder 30 with a screw and a tip extending to a tip side (opening 32 side) of the holder 30, and a claw portion 36 that is engaged with the stepped portion 14 of the valve head 2 is provided at the tip portion. The fixing pin 34 is made from an elastically deformable elastic member, such as synthetic resin, and the claw portion 36 can be elastically displaced in a radial direction of the holder 30.

The large-diameter portion 12 provided closer to the tip side than the base end portion 8 of the valve head 2 has an outer diameter larger than a gap between the claw portions 36 of two of the fixing pins 34 provided on the holder 30. The valve head 2 has a small-diameter portion 10, which has a smaller outer diameter than the large diameter portion 12, closer to the tip side than the large-diameter portion 12, and the stepped portion 14 is provided in a boundary portion between the small-diameter portion 10 and the large diameter portion 12.

Since the large-diameter portion 12 of the valve head 2 has an outer diameter larger than the gap between the claw portions 36 of two of the fixing pins 34, the claw portions 36 of the fixing pins 34 come into contact with the large-diameter portion 12 of the valve head 2 and spread away from each other when the valve head 2 is inserted into the holder 30, and each of the fixing pins 34 is elastically deformed. When, from this state, the valve head 2 is further inserted into the holder 30 and the claw portion 36 of the fixing pin 34 reaches the small-diameter portion 10 of the valve head 2, the claw portion 36 returns in an inner side direction by the elastic force of the fixing pin 34, and the stepped portion 14 and the claw portion 36 are engaged with each other. In this manner, the valve head 2 cannot be removed from the holder 30, and the valve head 2 is fixed to the holder 30.

In contrast, when the valve head 2 is removed from the driver 4, the gap between the claw portions 36 of the two fixing pins 34 is made wider than an outer shape of the large-diameter portion 12 of the valve head 2, so that the fixing pin 34 is no longer caught by the stepped portion 14 of the valve head 2 and the valve head 2 can be pulled out of the holder 30.

A fixing release member 16 is provided on the valve head 2 so that the valve head 2 can be easily detached from the driver 4. The fixing release member 16 is a ring-shaped member provided on the outer periphery of the small-diameter portion 16 of the valve head 2. The fixing release member 16 has a release claw portion 18 extending toward the base end side of the valve head 2, and a tip portion 20 of the release claw portion 18 has an inclined shape so as to become thinner toward the tip side. The fixing release member 16 is provided with a rotation prevention groove 22 through which a rotation prevention pin 24 protruding in the radial direction from an outer peripheral surface of the small-diameter portion 10 of the valve head 2. In this manner, although fixed in a circumferential direction of the valve head 2 by the rotation prevention pin 24, the fixing release member 16 can slide within a certain range along the outer surface of the small-diameter portion 10.

In the vicinity of the claw portion 36 of the fixing pin 34, a release protrusion portion 38 is provided for pushing the claw portion 36 outward using the slide of the fixing release member 16. The release protrusion portion 38 is configured to come into contact with the release claw portion 18 when the release claw portion 18 of the fixing release member 16 moves to the base end side in a state where the valve head 2 is fixed to the holder 30, and receive stress in a direction in which the claw portion 36 is pushed outward from the release claw portion 18. That is, when the fixing release member 16 is slid to the base end side of the valve head 2, the tip portion 20 of the release claw portion 18 enters between an outer peripheral surface of the holder and the release protrusion portion 38, and the claw portion 36 is displaced outward by utilizing the inclination of the tip portion 20 of the release claw portion 18, so that the fixing release member 16 releases the fixation of the valve head 2 by the fixing pin 34.

As described above, the fixing release member 16 is provided on the valve head 2. Accordingly, when the valve head 2 is removed from the driver 4, the claw portion 36 of the fixing pin 34 is disengaged from the stepped portion 14 of the valve head 2 as the fixing release member 16 is simply slid to the base end side of the valve head 2, and the valve head 2 becomes in a state of being able to be pulled out from the holder 30 of the driver 4. Accordingly, removal of the valve head 2 from the driver 4 is extremely easy.

Note that, when the valve head 2 is mounted on the driver 4, a protrusion 26 is provided on an outer surface of the valve head 2 so that the position of the release claw portion 18 of the fixing release member 16 is automatically positioned at the position where the fixing pin 34 is provided, and a guide groove 40 through which the protrusion 26 passes is provided in the holder 30. In this manner, when the valve head 2 is mounted on the driver 4, the protrusion 26 is positioned so as to pass through the guide groove 40, and the valve head 2 is simply inserted to a certain position in the holder 30, so that the valve head 2 is mounted on the portion 4 and the release claw portion 18 is positioned with respect to the fixing pin 34.

Figure 3:
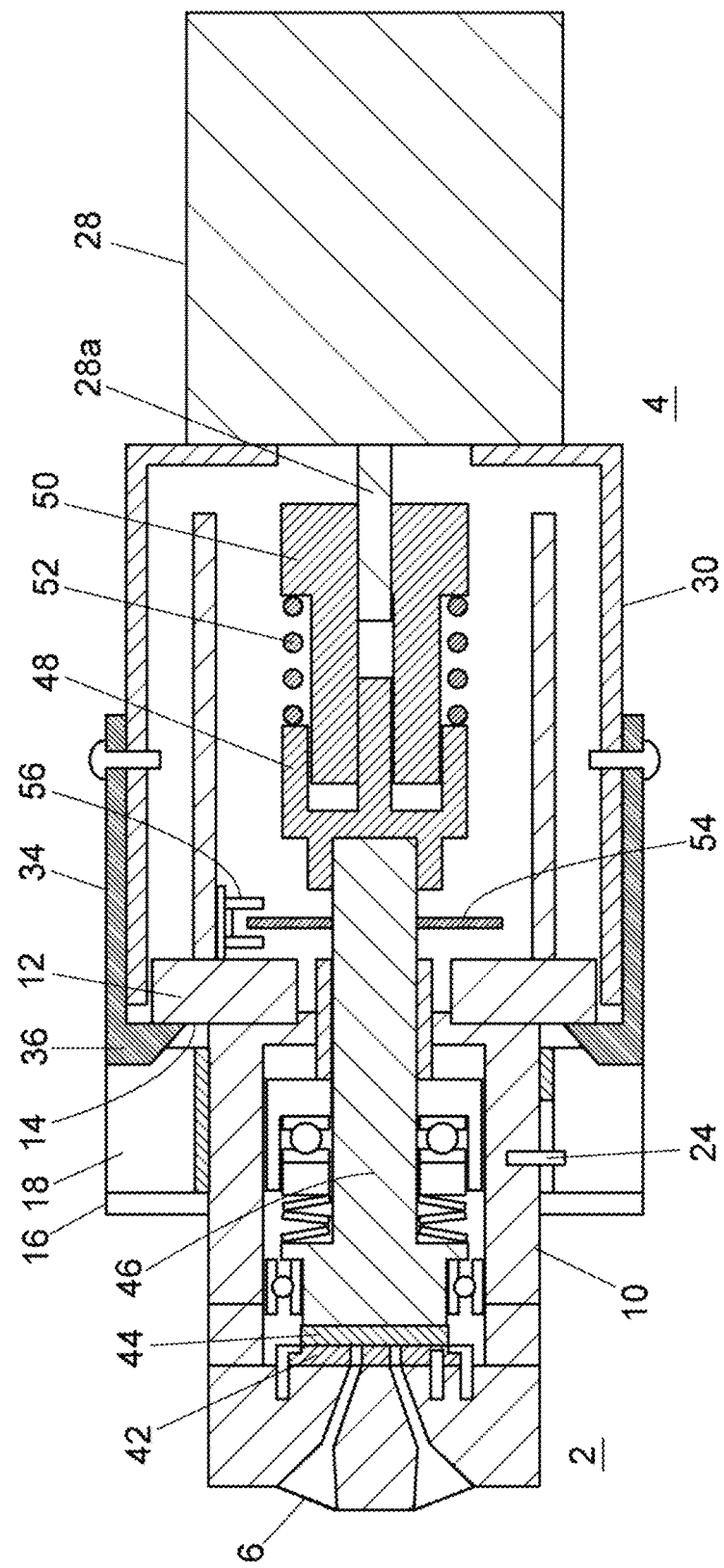
FIG. 3 is a cross-sectional view of the switching valve of the embodiment.

Next, an internal structure of the switching valve will be described with reference to FIG. 3.

In the inside of the valve head 2, the stator 42, the rotor 44, and the rotor shaft 46 are mainly provided. The stator 42 and the rotor 44 are both disk-shaped members, the stator 42 is fixed to an inner wall surface of the valve head 2, and the rotor 44 is fixed to a tip portion of the rotor shaft 46. The stator 42 and the rotor 44 are in close contact with each other, and the rotor 44 rotates while sliding with the stator 42 as the rotor shaft 46 rotates. The stator 42 is provided with through-holes communicating with the ports 6 of the valve head 2, and the rotor 44 is provided with a groove for connecting the through-holes of the stator 42.

A base end of the rotor shaft 46 extends to the base end side of the valve head 2. A rotor shaft side connector 48 for connecting to the drive shaft 28*a* of the motor 28 of the driver 4 is attached to the base end portion of the rotor shaft 46. The motor 28 of the driver 4 is provided so that the drive shaft 28*a* is placed coaxially with the rotor shaft 46 of the valve head 2 fixed to the holder 30. A drive shaft side connector 50 having a fitting structure with the rotor shaft side connector 48 is provided at the tip of the drive shaft 28*a* of the motor 28.

In the present embodiment, the rotor shaft side connector 48 is provided with a protrusion having a linear shape, and the drive shaft side connector 50 is provided with a groove for fitting the protrusion of the rotor shaft side connector 48. With the protrusion having a linear shape of the rotor shaft side connector 48 is fitted into the groove of the drive shaft side connector 50, the rotation of the drive shaft 28*a* is transmitted to the rotor shaft 46, by which the rotor 44 is rotated.

An elastic body 52, such as a coil spring, that extends and contracts in an axial direction of the drive shaft 28*a* is attached to the drive shaft side connector 50. The elastic body 52 is provided so as to be interposed and compressed between the rotor shaft side connector 48 and the drive shaft side connector 50 when the valve head 2 is fixed to the holder 30 by the fixing pin 34. In this manner, when the valve head 2 is fixed to the holder 30 by the fixing pin 34, the elastic body 52 in a compressed state presses the rotor shaft side connector 48 toward the tip side of the valve head 2, by which the entire valve head 2 is biased in a direction of being pulled out of the holder 30. The stepped portion 14 of the valve head 2 is strongly pressed against the claw portion 36 of the fixing pin 34 as the valve head 2 is biased in the direction of being pulled out from the holder 30. In this manner, the posture of the valve head 2 is stabilized.

That is, the elastic body 52 serves as a biasing member that is compressed when the valve head 2 is fixed to the holder 30 and biases the valve head 2 in a direction in which the valve head 2 is pulled out of the holder 30. Such a biasing member is not necessarily provided at a position shown in FIG. 3, and may be provided to press other portions of the valve head 2, such as a lower end surface of the large-diameter portion 12 of the valve head 2.

Further, a disc-shaped slit plate 54 for detecting a reference position of the rotor 44 is attached to the rotor shaft 46 perpendicularly to the axial direction of the rotor shaft 46. The slit plate 54 has a slit in one location. The slit plate 54 is displaced in a rotation direction by rotating with the rotation of the rotor shaft 46.

The valve head 2 includes a home position sensor 56 including an optical sensor that detects a slit of the slit plate 54. The home position sensor 56 is for detecting a "reference position" of the rotor shaft 46. That is, a rotation position of the rotor shaft 46 when the rotor shaft 46 is rotated and the home position sensor 56 detects the slit of the slit plate 54 becomes the "reference position" in the rotation direction of the rotor shaft 46.

Figure 4:
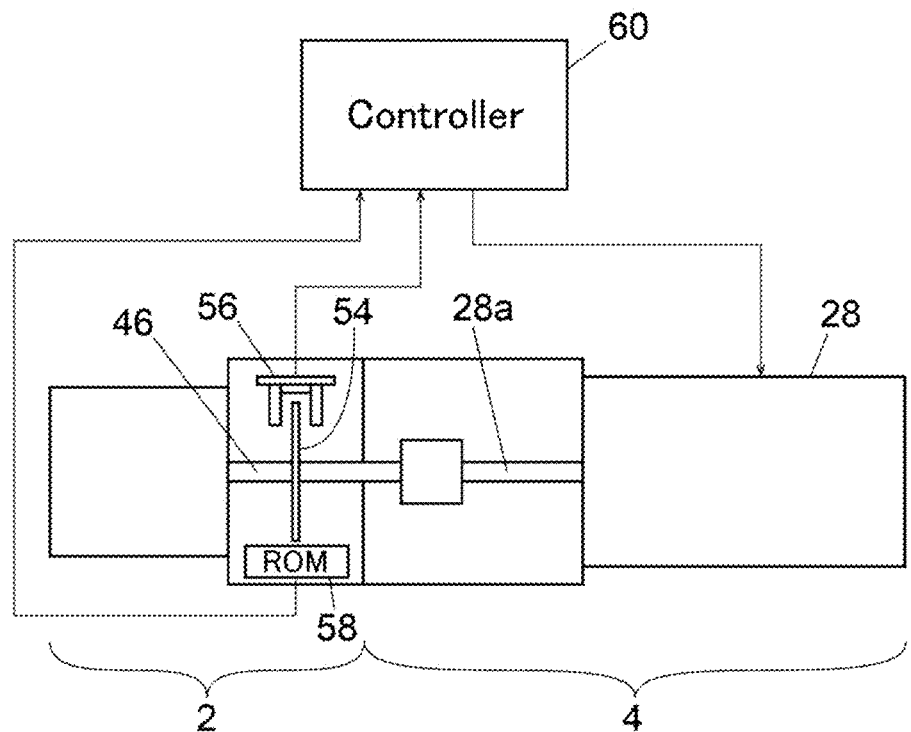
FIG. 4 is a schematic configuration diagram showing an example of a control system of the embodiment.

As shown in FIG. 4, the detection signal from the home position sensor 56 is taken into a controller 60. The controller 60 is configured to detect the reference position of the rotor shaft 46 by the home position sensor 56 and position the rotor 44 to a desired position based on a driving amount of the motor 28 from the reference position. Note that the controller 60 is realized by an arithmetic element, such as a microcomputer, and a program executed by the arithmetic element.

The driving amount of the motor 28 required to position the rotor 44 at a desired position from when the rotor shaft 46 is at the reference position is determined based on a relative positional relationship between the rotor 44 and the rotor shaft 46 (the slit of the slit plate 54). In the present embodiment, a nonvolatile memory (ROM) 58 is provided in the valve head 2, and information relating to the relative positional relationship between the reference position and a position of the rotor shaft 46 when the rotor 44 is at a predetermined position is held as teaching information in the nonvolatile memory 58. The nonvolatile memory 58 realizes a teaching information holder that holds teaching information.

Note that when the rotor 44 is at a predetermined position means when a mark, such as a notch, provided on the rotor 44 is at a predetermined position. In teaching work, for example, the number of drive pulses of the motor 28 necessary for the mark provided on the rotor 44 to reach the predetermined position from the position where the home position sensor 56 detects the slit of the slit plate 54, that is, from a state where the rotor shaft 46 is at the reference position are measured. Such teaching work is performed when the valve head 2 is assembled, and measurement results of the teaching work are held in the nonvolatile memory 58 as teaching information. The teaching information is information specific to each valve head 2.

The controller 60 is configured to read teaching information from the nonvolatile memory 58 of the valve head 2 mounted on the driver 4 and to position the rotor 44 at a desired position using the teaching information.

Although not shown, the valve head 2 is provided with a connector for electrically connecting the controller 60 to the home position sensor 56 and the nonvolatile memory 58. When the valve head 2 is replaced, the controller 60 is connected to the home position sensor 56 and the nonvolatile memory 58 via the connector provided on the valve head 2. In this manner, the controller 60 can perform positioning control of the rotor 44 using a detection signal of the home position sensor 56 and teaching information of the nonvolatile memory 58.

DESCRIPTION OF REFERENCE SIGNS

2: Valve head
4: Driver
6: Port
8: Base end portion of valve head
10: Small-diameter portion
12: Large-diameter portion
14: Stepped portion
16: Fixing release member
18: Release claw portion
20: Tip portion of release claw portion
22: Rotation prevention groove
24: Rotation prevention pin
26: Protrusion
28: Motor
30: Holder
32: Opening
34: Fixing pin
36: Claw portion
38: Release protrusion portion
40: Guide groove
42: Stator
44: Rotor
46: Rotor shaft
48: Rotor shaft side connector
50: Drive shaft side connector
52: Elastic body (biasing member)
54: Slit plate
56: Home position sensor
58: Nonvolatile memory (teaching information holder)
60: Controller

The invention claimed is:

1. A switching valve comprising:
a valve head having a plurality of connection ports connecting a pipe, a rotor accommodated therein and including a groove for connecting the connection ports, and a rotor shaft holding the rotor and rotatably equipped; and
a driver having a holder holding the valve head, and a motor rotating the rotor shaft of the valve head held by the holder, wherein
the valve head includes a home position sensor detecting a reference position in a rotation direction of the rotor shaft, and a teaching information holder holding teaching information acquired using the home position sensor, and the teaching information is information regarding a relative positional relationship between the reference position and a position of the rotor shaft when the rotor is at a predetermined position.

2. The switching valve according to claim 1, further comprising a controller configured to read the teaching information from the teaching information holder of the valve head held by the holder of the driver and to control operation of the motor based on the teaching information.

* * * * *